(12) United States Patent
Broecker et al.

(10) Patent No.: US 12,409,867 B2
(45) Date of Patent: Sep. 9, 2025

(54) AUTONOMOUS DRIVING MODE ASSISTANCE BASED ON VEHICLE FLEET DATA

(71) Applicant: CARIAD SE, Wolfsburg (DE)

(72) Inventors: Marco Broecker, Berlin (DE); Kai Kuhr, Berlin (DE)

(73) Assignee: CARIAD SE, Wolfsburg (DE)

( * ) Notice: Subject to any disclaimer, the term of this patent is extended or adjusted under 35 U.S.C. 154(b) by 84 days.

(21) Appl. No.: 18/187,968

(22) Filed: Mar. 22, 2023

(65) Prior Publication Data

US 2023/0303128 A1 Sep. 28, 2023

(30) Foreign Application Priority Data

Mar. 23, 2022 (DE) ...................... 10 2022 106 789.0

(51) Int. Cl.
*B60W 60/00* (2020.01)
*B60W 40/06* (2012.01)

(52) U.S. Cl.
CPC ........ *B60W 60/0059* (2020.02); *B60W 40/06* (2013.01); *B60W 60/0053* (2020.02)

(58) Field of Classification Search
CPC ......... B60W 60/0059; B60W 60/0053; B60W 40/06
See application file for complete search history.

(56) References Cited

U.S. PATENT DOCUMENTS

2019/0184997 A1 6/2019 Zheng et al.
2022/0212695 A1* 7/2022 Fendt .............. G08G 1/096775

FOREIGN PATENT DOCUMENTS

DE 10 2021 001 096 A1 5/2021
DE 10 2013 210 395 B4 6/2021
(Continued)

OTHER PUBLICATIONS

English Translation of CN113095344A Title: Evaluating, Optimizing Device, System And Method, Vehicle, Server And Medium Author: Tang et al. Date: Jul. 9, 2021 (Year: 2021).*
(Continued)

*Primary Examiner* — James J Lee
*Assistant Examiner* — Steven Vu Nguyen
(74) *Attorney, Agent, or Firm* — STAAS & HALSEY LLP

(57) ABSTRACT

A driver assistance method by a control device is to receive driving environmental data from identically constructed motor vehicle sensor technologies of a first motor vehicle, as well as from at least one further motor vehicle, which drive on a set road section in an at least partially autonomous driving mode. Each motor vehicle may provide a road section model for each of the motor vehicles with an algorithm recorded in each respective motor vehicle. The control device examines the road section models and/or the algorithms for a feasibility of the at least partially autonomous driving mode for the first motor vehicle, evaluates the algorithms of each motor vehicle based on a comparison of the road models, and sets that algorithm, which satisfies the set feasibility criterion with the highest probability, as the target algorithm. The control device sets the road section as a check section if the set feasibility criterion is not satisfied for the first motor vehicle, and generates and transfers an early warning signal to the further motor vehicles.

14 Claims, 1 Drawing Sheet

(56) References Cited

FOREIGN PATENT DOCUMENTS

DE  10 2022 106 789.0     3/2022
DE  10 2014 013 672 A1    8/2022

OTHER PUBLICATIONS

English Translation of KR20200138125A Title: System For Predicting The Automatic Driving Road Section And Method Thereof Author: Lee Jeong Hee Date: Dec. 9, 2020 (Year: 2020).*
Examination Report dated Nov. 11, 2022 in corresponding German Patent Application No. 10 2022 106 789.0 (6 pages).

* cited by examiner

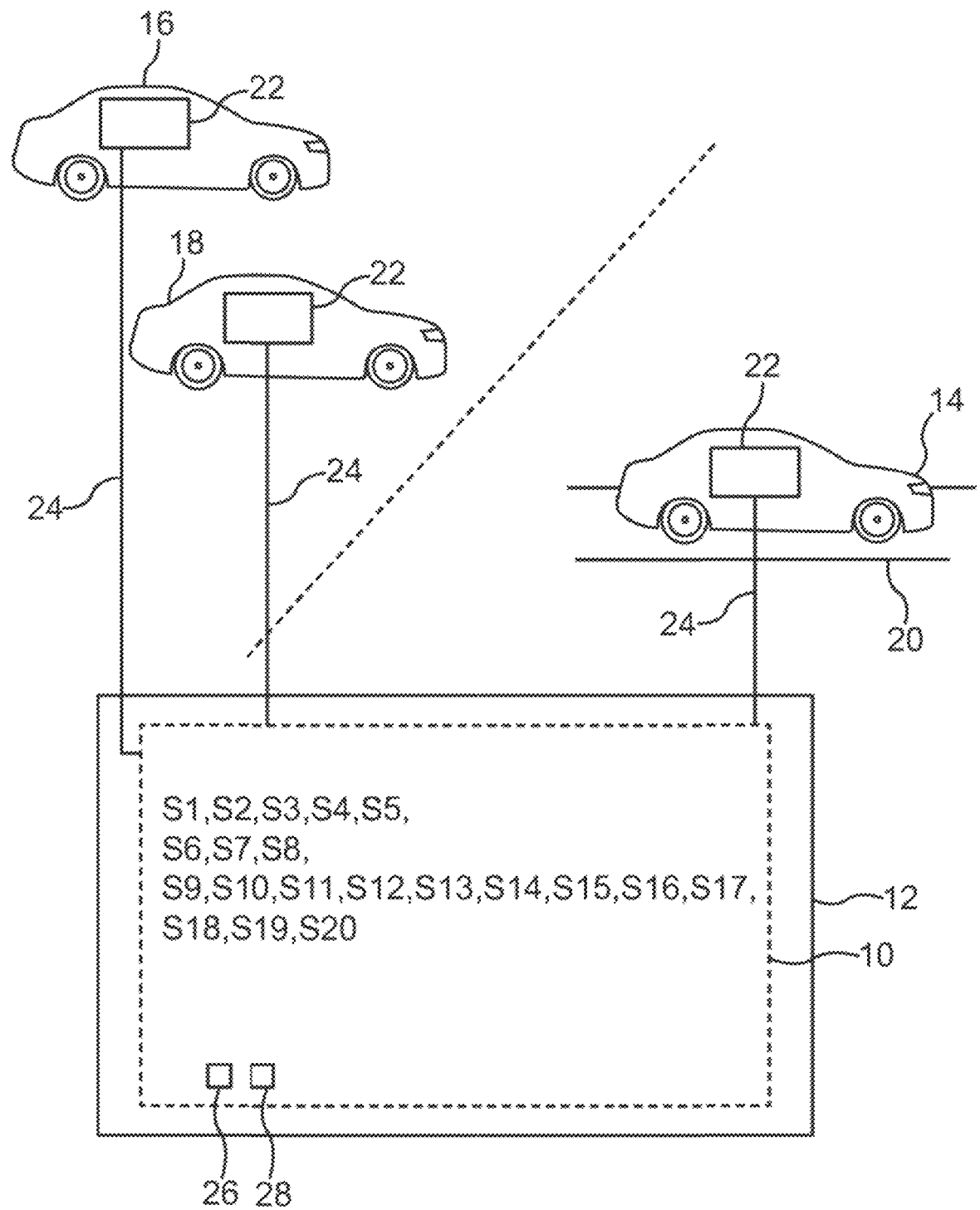

AUTONOMOUS DRIVING MODE ASSISTANCE BASED ON VEHICLE FLEET DATA

CROSS-REFERENCE TO RELATED APPLICATIONS

This application claims the benefit of German Application No. 10 2022 106 789.0 filed on Mar. 23, 2022, in the German Intellectual Property Office, the disclosure of which is incorporated herein by reference in its entirety.

BACKGROUND

1. Field

The examples describing an invention relate to a driver assistance method, which is performed by a control device. The driver assistance method according to the examples can be implemented in the context of a vehicle fleet. The method is performed by a control device, which can be localized in a server device external to motor vehicle, thus for example in a data server external to motor vehicle or in a data cloud.

2. Description of Related Art

In dangerous situations or situations, in which the system (vehicle) cannot safely perform the guidance anymore, the vehicle driver has to take the control. In already implemented solutions, these messages partially come at very short notice, which does not always provide the necessary period of time that the vehicle driver can again take the control. It can happen that the warning comes only few milliseconds before a possible departure from the road. Locally limited approaches via car-to-2X communication are known to early warning systems in autonomous driving functions.

From US 2019/0184997 A1, a method, a system and a medium to operate a motor vehicle are known.

DE 10 2021 001 096 A1 describes a method for the operation of a vehicle with an assistance system for the automated driving operation of the vehicle based on map data of a digital map.

DE 10 2013 210 395 B4 describes a method for data communication between a plurality of motor vehicles on the one hand and a central information pool external to vehicle on the other hand, wherein the plurality of motor vehicles each comprises an automatic driving mode, in which the respective motor vehicle is autonomously longitudinally and laterally guided by a control device of the motor vehicle.

In a single motor vehicle, the reliability and accuracy of the feasibility of an at least partially autonomous driving mode very severely depends on the fact if the system is up to date. In addition, a driver of a motor vehicle cannot be aware that the system is not up to date although an update is for example available, whereby the accuracy of the at least partially autonomous driving mode and thereby the probability that the driving mode can be performed, could be considerably higher. In particular in motor vehicle fleets, the additional problem arises that the motor vehicles may perform the driving modes with different reliability despite of identically constructed sensor technology. Thus, with multiple identically constructed vehicles with identically constructed sensor technology, in a part of the motor vehicle fleet, a fully autonomous driving mode can be more frequently aborted than in another motor vehicle of the fleet.

SUMMARY

The examples described allow increasing a quality of at least partially autonomous driving modes.

In an example, comparison may be performed of two or more identically constructed motor vehicles with identically constructed sensor technology, but which use different algorithms for examining a feasibility of an at least partially autonomous driving mode. By such an examination method, it can be determined, which one of the algorithms prevails. This allows that some of the motor vehicles can be retrofitted with a newer or other algorithm as necessary such that the reliability of the examination to the effect if the at least partially autonomous driving mode can be performed on a road section, considerably improves. Thereby, the at least partially autonomous driving mode can be much more frequently performed in these motor vehicles. In other words, the probability that at least partially autonomous driving modes are more reliably performed, can be increased in these motor vehicles.

Therein, the example may be based on an early warning system for partially autonomous or autonomous driving, in which a first motor vehicle initially measures a road section and examines if it can perform the at least partially autonomous driving mode, and then provides a kind of "path map" for a further motor vehicle. Therein, the principle is environmental monitoring by multiple motor vehicles, wherein it can then be compared if for example in a situation, in which few data can be captured (for example with difficult lighting conditions), one algorithm is better suitable than another one. Thus, the early warning system used thereto is not for the first motor vehicle, which has captured the "poor" data and has recognized the reasonable abortion of the at least partially autonomous driving mode, but the example may be based on an early warning system for another motor vehicle, which later passes on the same road section. Here, it also advantageously arises that the data from the motor vehicle fleet is not only very helpful for the further development of the algorithm, but also for hardware manufacturers, for example a manufacturer for cameras.

Exemplary problems in the data capture can for example be an unfavorable solar radiation, dust, snow or a too steep curve. Thus, it can be investigated in the examination method if it would have been possible for the first motor vehicle to deal with such a situation.

The driver assistance method according to the example may be performed by a control device. Therein, the control device can be a control device external to motor vehicle, which can for example be located in a data server external to motor vehicle.

The control device receives driving environmental data from a motor vehicle sensor technology of a first motor vehicle, which drives on a preset road section in an at least partially autonomous driving mode. Therein, the received driving environmental data is relevant environmental data for the operation of the first motor vehicle in the at least partially autonomous driving mode. Thus, the driving environmental data can for example describe captured traffic signs or the information thereof, which is for example captured by a camera of the motor vehicle sensor technology. In addition, the driving environmental data can for example describe a type of the road section, thus if the road section is for example a highway exit or a rural road or a highway section, geographic location data, weather data, lighting conditions or special values of the algorithms, thus for example controller values of the algorithm recorded in the first motor vehicle. Such controller values can for example describe which sensors are activated in case of strong solar radiation.

For the first motor vehicle with an algorithm recorded in the first motor vehicle, the control device provides a first road section model, which maps the received driving environmental data on the preset road section. Thus, the first road section model may be specific to the algorithm recorded in the first motor vehicle.

Based on the provided first road section model and by the algorithm recorded in the first motor vehicle, the control device examines a feasibility of the at least partially autonomous driving mode for the first motor vehicle and ascertains if a result examination for the at least partially autonomous driving mode satisfies a preset feasibility criterion. Therein, the preset feasibility criterion presets a minimum probability, with which the first motor vehicle can perform the at least partially autonomous driving mode on the preset section.

In other words, the feasibility criterion presets a minimum probability that the at least partially autonomous vehicle guidance is successfully feasible by the motor vehicle. Therein, the at least partially autonomous driving mode may be a defined driving mode, for example a lane keeping assistant or a fully autonomous driving mode.

If the preset feasibility criterion is not satisfied, thus if the probability, with which the first motor vehicle can perform the at least partially autonomous driving mode on the preset road section based on the first algorithm, is not sufficient to actually perform the at least partially autonomous driving mode, the control device presets the road section as a check section. Thus, the control device can associate the negative examination result with the check section. The association can for example be a qualitative association and describe if the feasibility criterion is satisfied or not. Alternatively, the association can also contain a quantitative statement, for example to what percentage the feasibility exists. By this measure, the performance of the first motor vehicle and thereby the performance of the first algorithm are preset as a reference.

The control device repeats this examination procedure for at least one further motor vehicle. Hereto, the control device ascertains at least one further motor vehicle with a motor vehicle sensor technology identically constructed to the first motor vehicle, wherein this motor vehicle is on a travel route and drives on this travel route on the check section at a later point of time than the first motor vehicle. In an example, the control device can ascertain the further motor vehicle to the effect that it will move on this travel route with a preset minimum probability. Hereby, a further motor vehicle is determined, whose performance of the at least partial driving mode can be reasonably compared to that of the first motor vehicle.

The control device generates an early warning signal, which describes a warning of a possible transition of the driving task to the driver of the second motor vehicle, and transfers the generated early warning signal to the second motor vehicle. The second motor vehicle can receive the transferred early warning signal for example via a communication module. The early warning signal can for example be transferred for output by an output device of the second motor vehicle, thus for example to a screen device or only as a trigger for performing the examination method to a control unit or to a control device of the second motor vehicle.

The control device receives driving environmental data to the check section from the motor vehicle sensor technology of the at least one further motor vehicle. Since the motor vehicle sensor technology is identically constructed, the algorithm of the further motor vehicle can now reliably be compared to that of the first motor vehicle. Hereto, the control device each provides a further road section model for the at least one further motor vehicle with an algorithm recorded in the respective further motor vehicle. Based on each further provided road section model and the respective recorded algorithm, the control device examines the feasibility of the identical, at least partially autonomous driving mode for the respective motor vehicle and ascertains if a respective result of the examination satisfies the preset feasibility criterion for the at least partially autonomous driving mode.

Based on a comparison of the examinations, thus the examination procedures, of the respective road models, the control device evaluates the respective algorithm with respect to the feasibility. Based on a comparison of the evaluations, the control device presets that algorithm, which satisfies the preset feasibility criterion with the highest probability. The control device presets this algorithm as a target algorithm.

The above described advantages arise.

In an example driver assistance method, the control device transfers an update file, which describes the preset target algorithm, to those of the further motor vehicles, the road models of which have not been examined with the target algorithm. This means that the update file is transferred to those motor vehicles, which not yet use and not yet have the target algorithm. Thereby, the motor vehicle fleet is extensively brought up to date, and all of the motor vehicles can perform the at least partially autonomous driving mode with the same very high reliability.

If the received driving environmental data does not satisfy the preset feasibility criterion, a further embodiment of the driver assistance method according to an example can provide that the control device predicates a period of time and/or a point of time, at which the at least one further motor vehicle reaches the check section. Therein, the control device can transfer the generated early warning signal to a communication module of the respective further motor vehicle in a preset time distance to the predicated period of time and/or the predicated point of time. Additionally or alternatively, the generated early warning signal can describe an output of the warning by an output device of the at least one further motor vehicle in the preset time distance. Thereby, a driver is also very early made aware of the fact that the driver has to become prepared in case the driver possibly has to take over the driving task.

In a further variant, which can be combined with the first variant, if the received vehicle environmental data does not satisfy the preset feasibility criterion, the control device can preset a spatial distance to the check section, at which the early warning signal is to be output. The generated early warning signal can then describe the output by the output device in the preset spatial distance. The same advantages arise.

Optionally, the control device can receive further driving environmental data from the motor vehicle sensor technology of the first motor vehicle during the travel of the first motor vehicle on the road section and after a change into a driving mode with a lower degree of autonomy than the at least partially autonomous driving mode. For example, this can be the case if the driving mode is switched from a fully autonomous driving mode to a partially autonomous driving mode or from a partially autonomous driving mode to a manual driving mode. Based on an analysis of the received further vehicle environmental data, the control device can supplement the provided first road section model. Then, the control device can examine if the first motor vehicle would have been able to control based on the provided road section model in the driving mode adjusted before the change, and with a positive result, adapt a sensor setting and/or a control value. Thus, if the control device for example determines that the motor vehicle would have correctly controlled the motor vehicle despite of a lower data density due to an unfavorable solar radiation, the control device can for example increase a setting of the camera, for example a light sensitivity. This also has effects on the examination result for examining the algorithm of the first motor vehicle and thereby on the comparison to the other algorithms.

In an example, the at least partially autonomous driving mode can be a currently active driving mode of the first motor vehicle. For the examination procedure with other motor vehicles, this driving mode can then for example be adjusted in the other motor vehicles on the road section, or only such motor vehicles can be used for the comparison, which drive in exactly the same driving mode over the road section.

In an example, the control device can be a control device external to motor vehicle.

The control device also belongs to the described examples of the invention. By a control device, an apparatus, an apparatus component or an apparatus group is understood, which is configured to receive and evaluate data, as well as to generate control signals and to transfer them to other components. For this purpose, the control device can comprise a corresponding receiving module and a corresponding transmitting module, as well as electronics for data processing. The control device according to an example can comprise a data processing device or a processor device, which may be configured to perform a method according to the examples. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise a program code, which may be configured, upon execution by the processor device, to perform a method according to the examples. The program code can be stored in a data storage of the processor device. In an example, the control device can be configured as a control apparatus, control chip, control unit or application program ("app").

A motor vehicle also belongs to the described examples of the invention, which comprises a control device according to the examples. In an example, the motor vehicle may be configured as a car, in particular as a passenger car or truck, or as a passenger bus or motorcycle.

The above set object may also be solved by a data server external to a motor vehicle for operating in the Internet, for example a data server, a backend and/or a data cloud, wherein the data server external to a motor vehicle comprises the control device according to the examples.

Developments of the control device according to the examples, of the motor vehicle according to the examples and of the data server external to motor vehicle according to the examples, which comprise features as they have already been described in context of the developments of the driver assistance method according to the examples, also belong to the described example of the invention. For this reason, the corresponding developments of the control device according to the examples, of the motor vehicle according to the examples and of the data server external to motor vehicle according to the examples are not again described here.

The examples described may also include the combinations of the features of the described examples. Thus, the examples described may also include realizations, which each comprise a combination of the features of multiple of the described examples, if the examples have not been described as mutually exclusive.

BRIEF DESCRIPTION OF THE DRAWING

These and other aspects and advantages will become more apparent and more readily appreciated from the following description of the examples, taken in conjunction with the accompanying drawing of which:

A single FIGURE ("FIG.") shows a schematic representation to an example method of an invention and of the devices according to the an example.

DESCRIPTION

The examples explained in the following are examples of an invention. In the examples, the described components of the examples each represent individual features to be considered independently of each other, which also each may develop the examples independently of each other. Therefore, the disclosure can also include combinations of the features of the examples different from the illustrated ones. Furthermore, the described examples can also be supplemented by further ones of the already described features of the examples.

In the FIGURES, identical reference characters each denote functionally identical elements.

The FIGURE illustrates an example of a method of an invention and of the devices according to an example. In the example of the FIGURE, a control device 10 can be a component of a data server 12 external to motor vehicle.

In the example of the FIGURE, a system is shown, which can include the data server 12 external to motor vehicle, a first motor vehicle 14 as well as two further motor vehicles 16, 18. Optionally to the implementation of the control device 10 in the data server 12, the control device 10 can be located in one of the motor vehicles 14, 16, 18.

The first motor vehicle 14 is located on a road section 20, for example a highway exit. The two further motor vehicles 16, 18 can be located several kilometers behind the first motor vehicle 14, as indicated by the dashed separating line, and it can be known to a control device for example by retrieving corresponding data that the two further motor vehicles 16, 18 are each on a travel route, which also leads over the road section 20, the preset highway exit. Therein, the motor vehicles 14, 16, 18 can be vehicles of a motor vehicle fleet.

Therein, the communication of the control device 10 with the individual motor vehicle sensor technologies 22 is effected via data communication links 24, which can ideally be wireless, for example WiFi links, Internet links and/or mobile radio links. For reasons of better clarity, corresponding transmitting and receiving modules of the individual motor vehicles 14, 16, 18 and of the control device 10 are not shown. Therein, the motor vehicle sensor technologies 22 may be identically constructed motor vehicle sensor technologies 22. If the control device 10 is installed in one of the motor vehicles 14, 16, 18, at least one data communication link 24 to the motor vehicle sensor technology of the same motor vehicle 14, 16, 18 can be wired, and can be correspondingly configured for example as a data bus of the respective motor vehicle 14, 16, 18.

In an example, the control device 10 can comprise a processor device 26 and/or a data storage 28. A program code for performing the driver assistance method can be stored on the optional data storage 28.

The control device first receives driving environmental data from the motor vehicle sensor technology 22 of the first motor vehicle 14 (S1). This driving environmental data can for example describe the road course of the road section 20, lighting conditions at the point of time, at which the first motor vehicle 14 travels on the road section 20 for example in a fully autonomous driving mode, as well as GPS data, thus location data.

In S2, the control device 10 then provides a first road section model, which control device 10 calculates with the algorithm recorded in the first motor vehicle 14. Hereto, the control device 10 can for example query in a driver assistance system or an on-board computer of the first motor vehicle 14, which algorithm the first motor vehicle 14 uses, or request the algorithm of the first motor vehicle 14 from the first motor vehicle 14. The digital first road section model maps the received driving environmental data on the set road section 20. For example due to currently unfavorable lighting conditions, for example strong backlight, data on traffic signs or possible obstacles on the road section 20 can for example lack. For example, only as many data can be present as a critical point is reached for this algorithm, in which a control system of the first motor vehicle 14 does not bear an examination S3 to the effect if the motor vehicle 14 can still perform the fully autonomous driving mode or not. In other words, the control device 10 ascertains in S4 that a set feasibility criterion, which can for example be stored in the data storage 28, does not bear the examination S3. The control device 10 sets the road section 20 as a check section (S5) to warn the further motor vehicles 16, 18 and to use the check section (thus the road section 20) as a kind of "test route" for comparing the algorithms of the motor vehicle fleet consisting of the motor vehicles 14, 16, 18. Therein, the control device 10 can optionally associate the negative examination result with the check section, thus the road section 20.

With respect to the first motor vehicle 14, the control device 10 can optionally receive further driving environmental data (S1) during the passage of the road section 20, for example after the driver assistance system of the first motor vehicle 14 has changed from a fully autonomous to a partially autonomous or manual driving mode, analyze the further driving environment data and supplement the first road section model by this further driving environmental data (S6), such that for example steering data, which the driver of the first motor vehicle 14 performs on the road section 20, can thus be entered into the first road section model (S6). In the example of the FIGURE, in a further examination procedure (S7), the control device 10 can optionally for example arrive at the result that the algorithm of the first motor vehicle 14 would have safely guided the first motor vehicle 14 over the road section 20 in the fully autonomous driving mode despite of the low data density. Based thereon, the control device 10 can for example adapt a sensor setting or a control value for example for providing the road section model (S8).

For example based on an examination of the travel routes of the further motor vehicles 16, 18, the control device 10 can ascertain (S9) that they are far behind the first motor vehicle 14, but soon drive over the road section 20. Either both further motor vehicles 16, 18 can already be guided in a fully autonomous driving mode or the control device 10 can optionally cause a respective driver assistance system to set a fully autonomous driving mode for traveling on the road section 20.

In S10, the control device 10 generates an early warning signal, which can describe a warning of a possible abortion of the fully autonomous driving mode, and transfers the early warning signal to both further motor vehicles 16, 18 (S11). The deficiency of the possible abortion of the fully autonomous driving mode can for example be concretized in that the control device 10 gives a GPS stamp to the data, which is then described by the early warning signal.

In an example, the control device 10 can predict a period of time and/or a point of time, at which the respective further motor vehicle 16, 18 reaches the check section (S12). The control device can for example calculate the period of time and/or the point of time with the aid of respective speed data and geographic data. The transfer of the early warning signal (S11) is then for example effected ten minutes before the respective further motor vehicle 16, 18 reaches the road section 20 such that a driver can be timely warned. Additionally or alternatively, the control device 10 can set a spatial distance to the road section 20, for example 500 meters, at which the early warning signal is to be output in the respective further motor vehicle 16, 18 (S13).

The further motor vehicles 16, 18 can then travel on the road section 20, thus the check section, at a later point of time and independently of each other and gather driving environmental data with the respective motor vehicle sensor technology 22. The control device receives driving environmental data from each of the further motor vehicles 16, 18 (S1) and each provides a road section model for each of the further motor vehicles 16, 18 (S14, S15), wherein the algorithm recorded in the respective further motor vehicle 16, 18 is respectively used. For each of the further motor vehicles 16, 18, the control device 10 each performs an examination procedure S16, S17 to test if the respective algorithm satisfies the set feasibility criterion. In the example of the FIGURE, it can for example result that the further motor vehicle 16 has recorded an algorithm, with which the fully autonomous driving mode can be reliably and safely performed despite of identical lighting conditions. For the further motor vehicle 18 and the algorithm thereof, it can for example result that the probability of a feasibility is at nearly 100 percent, thus, the further motor vehicle 18 uses the most reliable algorithm. The algorithm of the further motor vehicle 18 can thus be evaluated as the best algorithm (S18), followed by the algorithm of the further motor vehicle 16 as a further, reliable algorithm, with the algorithm of the first motor vehicle 14 as the worst. Thus, the algorithm, which is used by the further motor vehicle 18, can be preset as the target algorithm (S19), thus as the most reliable algorithm.

In order to bring the motor vehicles 14, 16 up to date, the algorithm of the further motor vehicle 18 can be provided as an update file and for example be transferred to the two other motor vehicles 14, 16 as a so-called "function on demand" (S20).

Overall, the examples show, how a for example cloud-based early warning system and shadowing can be provided (for (partially) autonomous driving).

In a further example, the comfort can be offered to the vehicle driver temporarily not to have to be concerned with guiding the vehicle.

It is a matter of a concept for transferring relevant situations (1) with, for example, a backend data server 12, the provision of this information (2) from the exemplary backend data server 12 to further traffic participants, the parallel analysis of the situation (3) by the vehicle (and optionally further traffic participants (2b)) and early warning (2a) of the vehicle driver.

(1) Relevant situations are captured either continuously (thus also with the function not active/switched on) or only with switched on/active function (for example highway pilot active). The manner when and/or in which vehicle states data is recorded, is not an essential constituent and can, for example, be selected specific to user and application. A relevant situation is characterized in that a motor vehicle 14 cannot capture the relevant situation with the sensors or cannot calculate the relevant situation with the downstream algorithms. The essential information generated therein (for example sensor values, special values of the algorithms, GPS data and/or diagnostic data) is provided to the exemplary backend data server 12. In case that an active vehicle guidance by the motor vehicle 14 was active before occurrence of the relevant situation and the vehicle driver had to take the control, the relevant situation can still be parallel evaluated by the motor vehicle 14 (see also 3), and this is also communicated to the exemplary backend data server 12 (thus, the vehicle optionally would have still correctly estimated the relevant situation).

(2) The provision of the information can also be performed as in (1) in continuous manner or only with the function switched on/active. The information can be provided to the vehicle either based on GPS data, milestones or route guidance.

(2a) With switched on and active autonomous driving function, the driver can hereby be early warned and gains valuable time (2b). With switched off function, the vehicle can analyze the situation in the background and provide the data to the exemplary backend—see also item (3).

(3) If a corresponding algorithm and/or a function cannot correctly estimate the situation, the vehicle control is passed to the driver. However, it can ideally be provided that the analysis continues in the background and the results are provided to the exemplary backend data server 12 in addition to the information in item (1). This can also occur by other/further traffic participants that obtain corresponding information in advance (see item (2)) (independently of whether function active or inactive), the traffic participant can also analyze the situation.

EXAMPLE

After a highway drive, a motor vehicle 14, for example an autonomously driving passenger car, wants to exit the highway. Herein, a lane keeping assistant takes the steering angle turn with for example camera and radar sensors. Due to local circumstances, for example unfavorable solar radiation angle, construction site markings, too steep curve, the system cannot calculate the correct steering angle turn and will pass the task to the driver.

With the applied described examples, upon first detection of this exit, the particularities would be stored and transferred into the exemplary backend data server 12. If another motor vehicle 16, 18 subsequently approaches, the driver can be warned or the system can even respond to the situation in more adapted manner (for example more severely decelerate, other camera evaluation algorithm).

Concept for transferring relevant situations (1) exemplarily with a backend data server 12, the provision of this information (2) from the exemplary backend data server 12 to further traffic participants, the parallel analysis of the situation (3) by the vehicle (and optionally further traffic participants (2b)) and early warning (2a) of the vehicle driver.

LIST OF REFERENCE CHARACTERS

10 Control device
12 data server
14 first motor vehicle
16 further motor vehicle
18 further motor vehicle
road section
22 motor vehicle sensor technology
24 data communication link
26 processor device
28 data storage
S1-S20 method steps

The invention claimed is:

1. A method of controlling a control device including at least one processor device to assist with setting a partially autonomous driving mode in a vehicle fleet, the method comprising:
by the control device, receiving driving environmental data from a first motor vehicle sensor technology of a first motor vehicle, among motor vehicles in the vehicle fleet, which drives on a road section in an at least partially autonomous driving mode, the received driving environmental data being environmental data to operate the first motor vehicle in the at least partially autonomous driving mode,
providing a first road section model for the first motor vehicle with a first algorithm, recorded in the first motor vehicle, which maps the received driving environmental data on the road section,
performing a first examination of feasibility of the at least partially autonomous driving mode of the first motor vehicle based on the first road section model and the first algorithm, ascertaining if a result of the first examination satisfies a set feasibility criterion for the at least partially autonomous driving mode,
if the set feasibility criterion is not satisfied,
setting the road section as a check section,
ascertaining at least one second motor vehicle, from among the motor vehicles, with a second motor vehicle sensor technology identically constructed according to the first motor vehicle sensor technology of the first motor vehicle, wherein the at least one second motor vehicle is on a travel route including the check section and drives on the travel route so as to drive on the check section at a later point of time than the first motor vehicle,
generating an early warning signal, which describes a warning of a possible transition of a driving task to a driver of the at least one second motor vehicle, transferring the generated early warning signal to the at least one second motor vehicle, and outputting the generated early warning signal by an output device in a set time distance to the check section,
receiving driving environmental data regarding the check section from the second motor vehicle sensor technology of the at least one second motor vehicle which drives on the check section in an at least partially autonomous driving mode of the at least one second motor vehicle, the received driving environmental data regarding the check section being environmental data to operate the at least one second motor vehicle in the at least partially autonomous driving mode of the at least one second motor vehicle,
providing a second road section model for the at least one second motor vehicle with a second algorithm recorded in the at least one second motor vehicle, which maps the received driving environmental data regarding the check section on the check section,
performing a second examination of feasibility of an at least partially autonomous driving mode of the at least one second motor vehicle, based on the second road section model and the second algorithm, and ascertaining if a result of the second examination satisfies the set feasibility criterion for the at least partially autonomous driving mode,
performing an evaluation of the second algorithm with respect to the feasibility based on a comparison of the second examination of the second road section model by the second algorithm to the first examination of the first road section model by the first algorithm, and
setting for a target motor vehicle, among the motor vehicles, a target algorithm, from among the first algorithm and the second algorithm, which satisfies the set feasibility criterion with a highest probability, based on a comparison of the evaluation of the first algorithm and the second algorithm.

2. The method of claim 1 further comprising: by the control device, transferring an update file, which describes the target algorithm, to a motor vehicle, among the motor vehicles, which has not used and does not have the target algorithm.

3. The method of claim 1, wherein
the method further includes:
by the control device,
if the received driving environmental data does not satisfy the set feasibility criterion,
predicting a period of time and/or a point of time, at which the at least one second motor vehicle reaches the check section, and
transferring the generated early warning signal to a communication module of the at least one second motor vehicle in the set time distance to the predicted period of time and/or the predicted point of time.

4. The method of claim 1, wherein
the method further includes:
by the control device,
if the received driving environmental data does not satisfy the set feasibility criterion,
setting a spatial distance to the check section, at which the generated early warning signal is to be output, and
outputting, by the output device, the generated early warning signal, in the set spatial distance.

5. The method of claim 1, further comprising:
by the control device,
after a change into a driving mode with a lower degree of autonomy than the at least partially autonomous driving mode, receiving further driving environmental data from the first motor vehicle sensor technology of the first motor vehicle during the travel of the first motor vehicle on the road section,
supplementing the provided first road section model based on an analysis of the received further driving environmental data,
performing an examination of whether the first motor vehicle would have been able to control in the driving mode set before the change based on the first road section model, and
based on a positive result of the examination, adapting a sensor setting and/or a control value.

6. The method of claim 1, wherein the at least partially autonomous driving mode is a currently active driving mode of the first motor vehicle.

7. The method of claim 1, wherein the control device is external to a motor vehicle, from among the motor vehicles.

8. A control device, comprising:
at least one processor device configured to assist with setting a partially autonomous driving mode in a vehicle fleet,
wherein the control device is configured to:
receive driving environmental data from a first motor vehicle sensor technology of a first motor vehicle, among motor vehicles in the vehicle fleet, which drives on a-set road section in an at least partially autonomous driving mode, the received driving environmental data being environmental data to operate the first motor vehicle in the at least partially autonomous driving mode,
provide a first road section model for the first motor vehicle with a first algorithm, recorded in the first motor vehicle, which maps the received driving environmental data on the road section,
perform a first examination of feasibility of the at least partially autonomous driving mode of the first motor vehicle based on the first road section model and the first algorithm, to ascertain if a result of the first examination satisfies a set feasibility criterion for the at least partially autonomous driving mode,
if the set feasibility criterion is not satisfied,
set the road section as a check section,
ascertain at least one second motor vehicle, from among the motor vehicles, with a second motor vehicle sensor technology identically constructed according to the first motor vehicle sensor technology of the first motor vehicle, wherein the at least one second motor vehicle is on a travel route including the check section and drives on the travel route so as to drive on the check section at a later point of time than the first motor vehicle,
generate an early warning signal, which describes a warning of a possible transition of a driving task to a driver of the at least one second motor vehicle,
transfer the generated early warning signal to the at least one second motor vehicle, and output the generated early warning signal by an output device in a set time distance to the check section,
receive driving environmental data regarding the check section from the second motor vehicle sensor technology of the at least one second motor vehicle which drives on the check section in an at least partially autonomous driving mode of the at least one second motor vehicle, the received driving environmental data regarding the check section being environmental data to operate the at least one second motor vehicle in the at least partially autonomous driving mode of the at least one second motor vehicle,
provide a second road section model for the at least one second motor vehicle with a second algorithm recorded in the at least one second motor vehicle, which maps the received driving environmental data regarding the check section on the check section, perform a second examination of feasibility of an at least partially autonomous driving mode of the at least one second motor vehicle, based on the second road section model and the second algorithm, and ascertain if a result of the second examination satisfies the set feasibility criterion for the at least partially autonomous driving mode, perform an evaluation of the second algorithm with respect to the feasibility based on a comparison of the second examination of the second road section model by the second algorithm to the first examination of the first road section model by the first algorithm, and set for a target motor vehicle, among the motor vehicles, a target algorithm, from among the first algorithm and the second algorithm, which satisfies the set feasibility criterion with a highest probability, based on a comparison of the evaluation of the first algorithm and the second algorithm.

9. The control device according to claim 8, wherein the control device is further configured to:

if the received driving environmental data does not satisfy the set feasibility criterion,
predict a period of time and/or a point of time, at which the at least one second motor vehicle reaches the check section, and
transfer the generated early warning signal to a communication module of the at least one second motor vehicle in the set time distance to the predicted period of time and/or the predicted point of time.

10. The control device according to claim 8, wherein the control device is further configured to:

if the received driving environmental data does not satisfy the set feasibility criterion,
set a spatial distance to the check section, at which the generated early warning signal is to be output, and
output, by the output device, the generated early warning signal, in the set spatial distance.

11. The control device according to claim 8, wherein the control device is further configured to:

after a change into a driving mode with a lower degree of autonomy than the at least partially autonomous driving mode, receive further driving environmental data from the first motor vehicle sensor technology of the first motor vehicle during travel of the first motor vehicle on the road section and,
supplement the provided first road section model based on an analysis of the received further driving environmental data,
perform an examination if-of whether the first motor vehicle would have been able to control in the driving mode set before the change based on the first road section model, and
based on a positive result of the examination, adapt a sensor setting and/or a control value.

12. The control device according to claim 8, wherein the at least partially autonomous driving mode is a currently active driving mode of the first motor vehicle.

13. A data server external to motor vehicle, which comprises the control device according to claim 8.

14. A motor vehicle, which comprises the control device according to claim 8.

* * * * *